Figure 1:
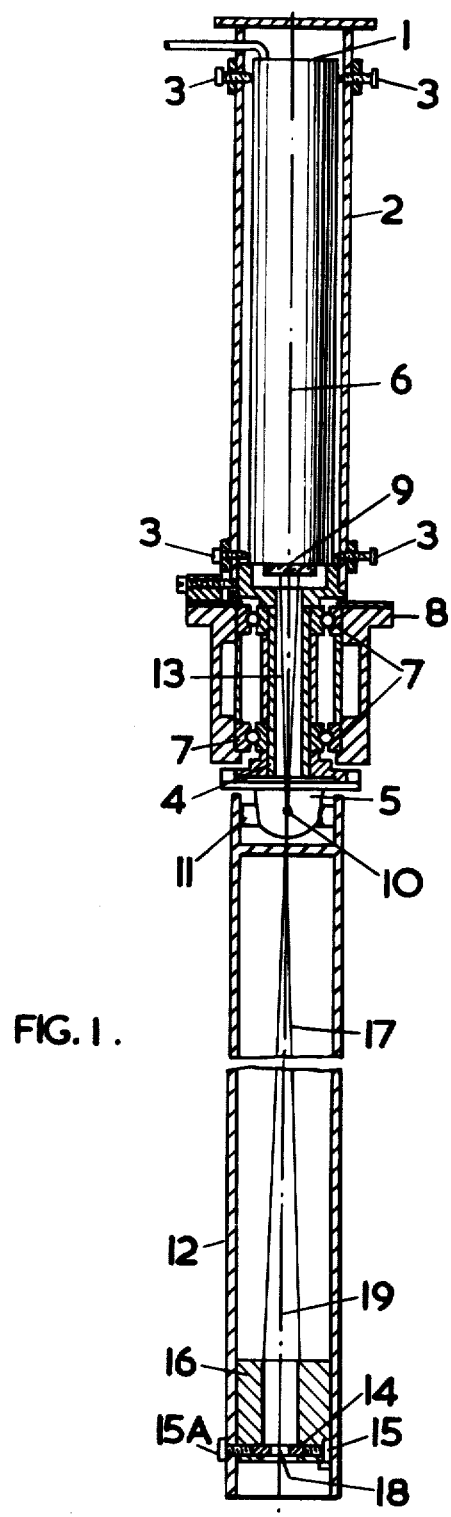

United States Patent [19]

Tolmon

[11] 4,053,239
[45] Oct. 11, 1977

[54] AXIS DEFINITION APPARATUS

[75] Inventor: Francis Richard Tolmon, Leatherhead, England

[73] Assignee: The Secretary of State for Industry in Her Britannic Majesty's Government of the United Kingdom of Great Britain & Northern Ireland, London, England

[21] Appl. No.: 628,780

[22] Filed: Nov. 4, 1975

[30] Foreign Application Priority Data

Nov. 5, 1974 United Kingdom ............... 47777/74
May 19, 1975 United Kingdom ............... 21314/75

[51] Int. Cl.² ........................................... G01C 9/14
[52] U.S. Cl. ................................... 356/250; 33/286; 356/149
[58] Field of Search ............... 356/138, 148, 149, 250; 33/286

[56] References Cited

U.S. PATENT DOCUMENTS 3,471,234  10/1969  Studebaker .................. 356/138 X
3,911,588  10/1975  Ohneda ........................ 33/286

Primary Examiner—John K. Corbin
Assistant Examiner—Matthew W. Koren
Attorney, Agent, or Firm—Cameron, Kerkam, Sutton, Stowell & Stowell

[57] ABSTRACT

There is disclosed an apparatus for defining a vertical axis by means of a freely suspended optical system acting as a plumb line. In equilibrium, the optical system has a vertical optical axis about which real images can be detected at distances of the order of a thousand feet above or below the optical system. The apparatus is capable of considerable accuracy in generating a vertical axis for alignment purposes.

16 Claims, 7 Drawing Figures

AXIS DEFINITION APPARATUS

This invention relates to axis definition apparatus, and more particularly to optical means for performing the function of a plumb line.

A plumb line is certainly the simplest and cheapest means of establishing a vertical axis. It is, however, somewhat difficult to stabilise, particularly in adverse weather conditions, and is also cumbersome in use when heights, and therefore plumb line lengths, in excess of a few meters are involved. Plumb lines are also limited to providing vertical axes only. The present invention provides an alternative to the use of conventional plumb lines for the purpose of establishing an axis.

According to the invention, axis definition apparatus includes means for defining a point source of light, an optical image forming device having an optical center, capable of transmitting or reflecting light to form one or more real images of the said point source of light and capable of defining an optical axis in terms of a line through the said optical center and the point source of light, an axis control member operative to control the positions of the point source of light and the optical image forming device, the axis control member being capable of being freely suspended to pivot about a pivotal point, and means for adjusting the position of the optical axis relative to the axis control member such that the optical axis may be adjusted to be vertical when the axis control member is in equilibrium.

Those skilled in the field of optics will readily appreciate that the term "point source of light" is a term of the art implying a small but non-zero area rather than a geometrical point. The point is taken to be an area sufficiently small to produce an image or images of acceptable clarity for the purpose required, having regard to the type of image forming device employed. It is to be noted that the point need not be self-luminous, but may be a point from which light diverges or appears to diverge such as a focal point, and thus may be either real or virtual.

Preferably, although not necessarily, the means for defining a point source of light is adapted to operate upon a laser output beam, the laser output being modified if necessary by a lens or a lens system, and the optical image forming device preferably may be a lens, a Fresnel zone plate or a grating. Alternatively, the image forming device may be a mirror, a reflecting zone plate or a reflecting grating. Further alternatives include a lens in combination with either a Fresnel zone plate or a coarse grating.

The axis control member is preferably freely suspended by means of a universal joint having one relatively fixed portion and one relatively movable portion, the relatively movable portion being attached to the control member.

Advantageously, the optical image forming device and the means for defining a point source of light are mounted within the axis control member which may itself conveniently be a tube, and the optical axis may conveniently be adjusted to coincide with the axis of the tube. A pinhole may preferably be mounted within the axis control member, either to define a point source of light or to act as a baffle to restrict stray light.

Conveniently, the means for adjusting the position of the optical axis relative to the axis control member comprises adjustment screws.

Advantageously, in operation of the axis definition apparatus, the axis control member is freely suspended such that it pivots freely about a pivotal center such as the pivotal center of a universal joint, and the optical axis defined by the point source of light and the optical image forming device passes through the pivotal center and either the optical center of the image forming device is disposed at or near, and the point source is remote from, the said pivotal center, or the point source is disposed at or near, and the image forming device is remote from, the pivotal center.

For the purposes of critical adjustment and subsequent monitoring of the axis definition apparatus, it is advantageous if the apparatus is mounted to permit rotation about an approximately vertical axis through the pivotal point. If the optical axis is not vertical, it will sweep out the surface of a cone when the apparatus is rotated which cone semi-angle will tend to zero as the optical axis is adjusted to approach the vertical.

Figure 2:
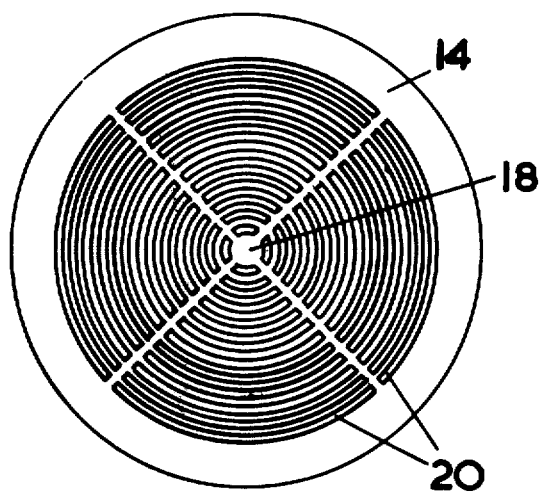
Figure 3:
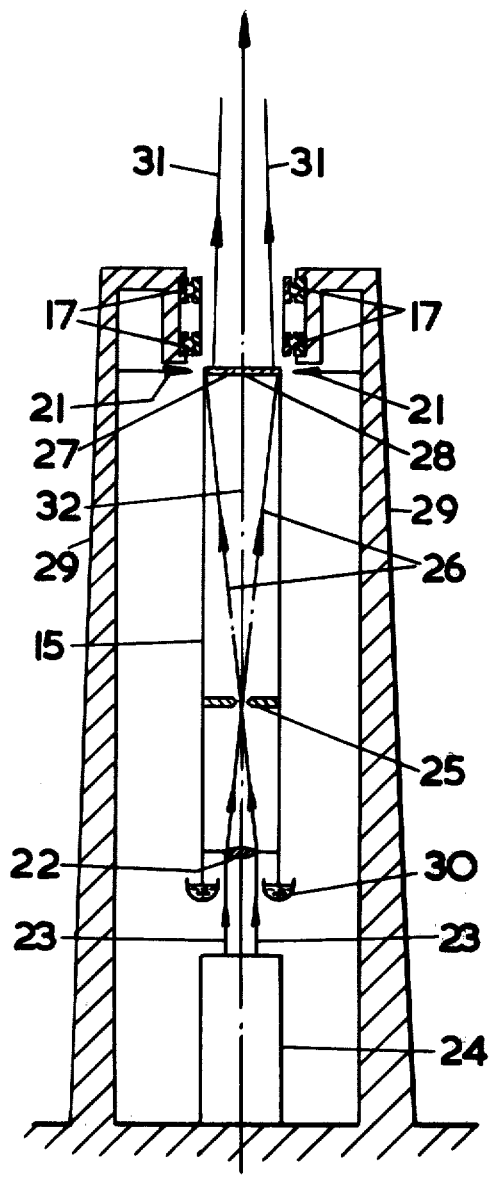
Figure 4:
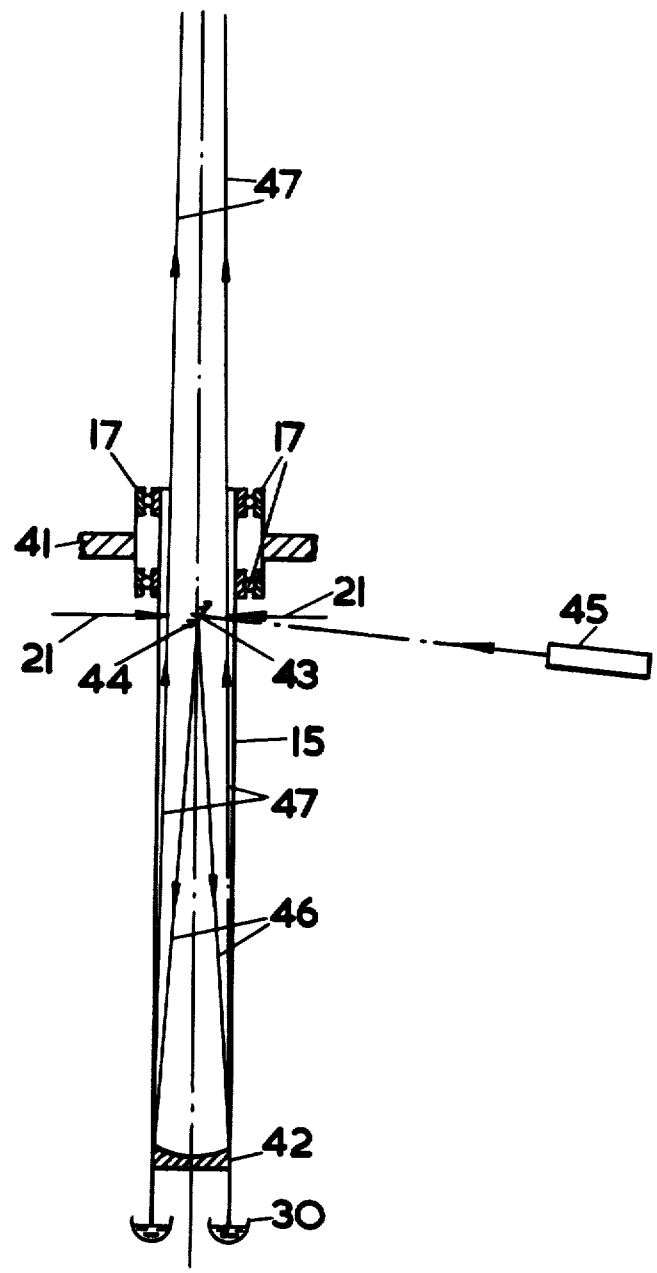
Figure 5:
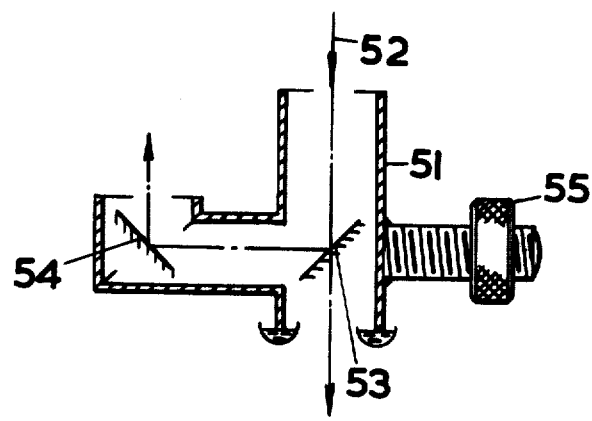
Figure 6:
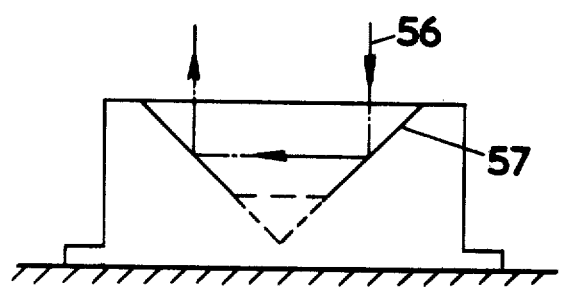
Figure 7:
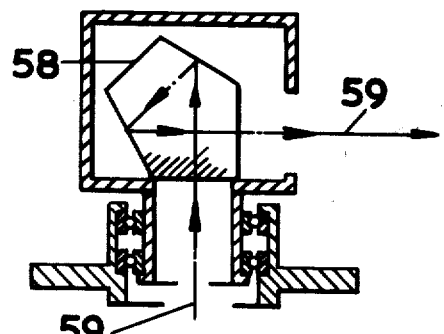

In order that the invention may be more fully understood, embodiments thereof will now be described, by way of example, with reference to the accompanying FIGS. 1 to 7, in which:

FIG. 1 is a schematic drawing of axis definition apparatus in accordance with the invention and in the form of a downwardly directed laser plumb line, FIG. 2 is a diagram of a coarse optical grating employed as the optical image forming means in the laser plumb line of FIG. 1, FIG. 3 is a schematic drawing of axis definition apparatus in the form of an upwardly directed laser plumb line, FIG. 4 illustrates a laser plumb line of the invention employing reflecting optics, FIG. 5 illustrates a unit suitable for use with apparatus of the invention for the purpose of changing a light beam direction, FIG. 6 illustrates an alternative unit incorporating a corner cube prism for the purpose of changing a light beam direction, and FIG. 7 illustrates a further alternative unit incorporating a pentagonal prism for the purpose of changing a vertical light beam to a horizontal light beam.

FIG. 1 illustrates an optical system of the invention in which a cylindrical Helium-Neon laser 1, 40 cm in length, is mounted within a container 2 and is adjustable therein by screws 3 which facilitate vertical alignment and lateral positioning. The laser 1 and container 2 form an assembly mounted on a support member 4 to which is also attached the relatively fixed portion 5 of a universal joint. The support member 4 is rotatable about the axis 6 of the cylindrical laser 1 by means of bearings 7 set in a flanged housing 8. The housing 8 is suitable for mounting on, for example, a structural member of a building. A converging lens 9 converges the light output of the laser 1 to a focus point 10, the focus point 10 acting as a point source of light in the optical system. The focus point 10 is adjusted by means of the screws 3 to coincide with the pivotal center of the universal joint. The universal joint includes a relatively movable portion 11 to which is secured an axis control member in the form of a cylindrical tube 12. The support member 4 and the relatively fixed and movable portions 5 and 11 respectively of the universal joint are hollow, and define a light passage 13. A coarse circular grating 14 acting as an optical image forming device is retained by locking screws 15 on an annular brass support 16. Centering screws 15A permit positional adjustment of the grating 14 (one only of each of the screws 15 and 15A is shown in FIG. 1). A light beam 17 diverges down the tube 12 from the laser focus point 10 to fill the course grating 14. The light focus point 10 acting as a point source of light and the optical center 18 of the coarse grating together define an optical axis 19.

Referring now also to FIG. 2, the coarse grating 14 consists of an opaque disc having arcuate light-transmitting slots 20. The slots 20 are 0.25 mm wide and are radially spaced by 0.5 mm. Light received from a point source is diffracted by a coarse grating of the type illustrated in FIG. 2 to produce a series of concentric bright and dark rings which form "bulls-eye" images centered on an axis. This axis is the optical axis of the system defined by a line through the optical center of the coarse grating and the point source. The point source may, of course, be a virtual one. By virtue, therefore, of the properties of the coarse grating 14 incorporated in the arrangement of FIG. 1, a series of "bulls-eye" images (not shown) are produced by the coarse grating 14 below its plane, this being achieved by diffraction on the light beam 17. The images are centered on the optical axis 19 through the light focus point 10 and the optical center 18 of the coarse grating 14. The concentric ring images broaden somewhat and become more diffuse with increasing distance from the grating 18. However, using an 0.5 mm pitch grating and a point source of light distant 1.1 m from its optical center, a recognizable image can be detected on the optical axis at all distances between 3 m and 100 m from the grating.

Referring now to adjustment of the device illustrated in FIG. 1, it is advantageous to adjust the focus point 10 to lie accurately on a vertical line through the pivotal center of the universal joint. Along this line, small departures of the focus point 10 from coincidence with the pivotal center do not materially affect the image beam direction, ie the optical axis 19. However, horizontal departures of the focus point 10 from coincidence with the pivotal center do shift the image beam.

In practice, to align the system the relatively movable portion 11 of the universal joint is detached, and the adjusting screws 3 are employed to bring the lawer focus point 10 into coincidence with the pivotal center of the universal joint. The relatively movable portion is then re-attached, and the laser 1 and tube 12 are rotated in the bearings 7. The optical axis 19 and the concentric ring image system sweep out the surface of a cone if the optical center 18 of the coarse grating 14 is not vertically below the focus point 10. The centering screws 15A are employed to bring the optical center 18 vertically below the focus point 10, and the semi-angle of the cone — swept out as the laser 1 and tube 12 are rotated — goes to zero as the optical center 18 approaches this position. When the optical center 18 has been positioned accurately, the locking screws 15 are fully tightened. In practice, the positions of the laser focus point 10 and the concentric ring images are detected on a piece of card or other convenient screen. It is not necessary for the laser beam to be accurately vertical, provided that the laser focus point 10 and the optical center 18 lie on the same vertical axis, and provided also that some of the laser light remains incident on the coarse grating 14. With these provisos, tilting the laser beam off the vertical merely reduces the intensity of the "bulls-eye" image system which otherwise remains stationary.

It is advantageous to provide for damping of any oscillatory motion of the tube 12 when freely suspended. Such damping may be achieved by means of, for example, an oil dashpot acting upon a part of the tube member remote from the pivotal center of the universal joint.

The optical axis 19 of the optical system of FIG. 1 is defined by a line through the laser focus point 10 and the optical center 18 of the image forming device. The laser focus point 10 is not a geometrical point in this embodiment of the invention but a spot of light about 0.5 mm in diameter. The optical axis 19 passes through the center of this spot of light, which is sufficiently small both for axis definition purposes and for producing recognizable images at distances from the apparatus in the range 3 m to 100 m when employing a coarse grating of 0.5 mm pitch. The spot of light is therefore a point source for all practical purposes. Other types of optical system employed in accordance with the invention might usefully incorporate other sizes of such spots of light which are also optically equivalent to point sources. It is therefore to be understood that the terms "point source of light" and "focus point" employed in this specification are taken to mean spots of light which are negligible in area having regard to the optical system concerned and the clarity of the images it produces.

The embodiment of the invention hereinbefore described employs an arcuate slot grating as an image forming means. Other image forming devices, such as zone plates or lenses, may for example be substituted, or reflecting equivalents of these optical elements may be employed. Moreover, further alternatives include combinations such as a lens with a zone plate and a lens with a coarse grating. However zone plates or lenses produce images which are in focus at one position only for a given position of a point source of light. This is not necessarily ideal for some of the purposes of the present invention, for which it may be desirable that recognisable images can be detected over a wide range of distances from the apparatus. By a suitable adjustment of a lens employed as an image forming device, however, a substantially parallel beam may be produced and used to define the required axis over a range of distances. The range can extend from 1 m to 200 m or more from the apparatus depending on the lens arrangement employed. Coarse gratings possess a similar advantage to the parallel, lens-produced light beam in relation to the present invention in that recognizable images may be produced over a large range of image positions for a given light source position. The 0.5 mm pitch grating hereinbefore employed produces recognisable images at all distances from the apparatus of between about 3 m and 100 m with a point source of light 1.1 m from the optical center of the grating. The interval of 3 m to 100 m can be varied by changing the grating pitch and the light source-grating separation, thereby changing the useful length of the plumb line. If a particular interval is required, the appropriate separation and grating to achieve it are chosen in accordance with the laws of optics.

When a vertical axis is needed, it is often essential to generate the axis in an upwards direction. Such circumstances arise when, for example, the apparatus is required to be sited on the ground to monitor construction or motion of a building.

FIG. 3 is a schematic diagram of an embodiment of the invention adapted to generate a vertical axis or reference in an upwards direction. A universal joint, indicated schematically by arrows 21, comprises a relatively fixed member (not shown) mounted on bearings 17 rotatable about an approximately vertical axis, and a relatively movable member (also not shown) retaining a depending tube member 15. A laser 24 and associated converging optics (not shown) provides light rays 23 converging to the pivotal center of the universal joint indicated by arrows 21. The light rays 23 are focussed by a lens 22 onto the center of a pinhole 25 provided in the tube member 15. Light rays 26 diverge from the pinhole 25 to overfill an image forming element 27. The optical center 28 of the image forming element 27 is arranged to coincide with the pivotal center of the universal joint indicated by arrows 21. The bearings 17 are mounted on a support member 29. Oscillations of the tube 15 are damped by an oil dashpot 30. The image forming element 27 may transmit a focussed or a parallel beam, indicated by light rays 31, depending on the type and disposition of the image forming element employed. The optical center 28 of the image forming element 27 and the real point source formed at the pinhole 25 define an optical axis 32. The pinhole 25 is useful in reducing stray light, but may be omitted in some cases since the real point source is formed independently of it. The axis 32 is adjustable to the vertical by means of the rotational technique described for the apparatus of FIG. 1. Thereafter, the light rays 31 define an upwardly directed vertical beam or inverted plumb line. This is particularly valuable for situations in which it is required to site apparatus at a low level, and to produce an accurate vertical axis through points above that level.

FIG. 3 illustrates an optical arrangement which is sensibly different from that of FIG. 1. The contrast is made advisedly to bring out the essence of the invention. The basic inventive concept lies in the use of a pendular optical system arranged to have a vertical optical axis. Those knowledgeable in the field of optics will appreciate that there are many ways of producing an equivalent optical system. The point source, for example, may be real or virtual, and similarly the image forming device may be a mirror, a lens, or a transmissive or reflective Fresnel zone plate or grating, or any other appropriate combination of such elements.

It is a well-known optical principle that lens systems can generally be replaced by mirror system equivalents. FIG. 4 illustrates schematically apparatus employing reflecting optics to produce an upwardly directed axis or reference. In FIG. 4, a universal joint indicated schematically by arrows 21 comprises a relatively fixed portion and a relatively movable portion (not shown). The relatively fixed portion (not shown) is rotatably mounted in a support member 41 by means of bearings 17 rotatable in the horizontal plane, and the relatively movable portion (not shown) retains a depending tube member 15. The tube member 15 locates a convex mirror 42 at or near the pivotal center 43 of the universal joint. The pivotal center 43 lies in the surface of a plane mirror 44 mounted within the tube 15. The light output of a laser 45 is converged by a lens or lens system (not shown) to a focus at the pivotal center 43. The plane mirror 44 reflects this light down the tube 15 onto the convex mirror 42 as indicated by light rays 46. The convex mirror reflects the light rays 46 to give light rays 47 which may be either converging as shown or parallel according to whether the separation of the plane and convex mirrors 44 and 42 is respectively greater than or equal to the focal length of the convex mirror. Oscillations of the tube 15 are damped by an oil dashpot 30.

The optical arrangement of FIG. 4 is essentially that of a Newtonian reflecting telescope; other alternative arrangements can be envisaged merely by the perusal of standard optical texts.

Once a vertical light beam has been generated as hereinbefore described, it is possible to generate a beam in any direction by rotating the beam through an appropriate angle. FIG. 5 shows a reflecting device 51, which could be fixed to the lower end of the tube 12 in FIG. 1 for example, in which a downwardly light beam 52 is reversed in direction and laterally shifted in position by mirrors 53 and 54. An adjustable counterbalance weight 55 is used to align the system vertically; an alteration to the inclination of one or other of the mirrors 53 and 54 produces a change in the inclination of the beam to the vertical. FIG. 6 illustrates directional reversal of a light beam 56 by means of a corner cube prism 57. FIG. 7 illustrates the use of a 90° deviation pentagonal prism 58 to turn a light beam 59 through 90°. If the pentagonal prism 58 is mounted to permit rotation about the vertical axis defined by the light beam 59, the light beam 59 will then be capable of sweeping out a horizontal plane. Pentagonal prisms giving other deviations may be used to give axes and planes having a range of inclinations to the vertical, and, clearly, other optical methods exist for achieving this.

The various embodiments of the invention hereinbefore described employ apparatus for which equivalents are available. A laser light source has been used in all cases for reasons of convenience since it provides a high intensity, directional, monochromatic beam.

The laser can therefore provide a greater length of usable axis than an alternative light source of equivalent power. However, the use of other light sources is by no means ruled out. Furthermore, those knowledgeable in the field of optics will appreciate that a variety of optical systems can be envisaged which lie within the scope of the invention. Accordingly, it is to be understood that the examples of the invention hereinbefore described should in no way be construed as limiting the scope of the invention.

What is claimed is:

1. Axis definition apparatus including a laser operable to produce an output beam, focussing means for defining a point source of light from the said output beam, an optical image forming device having an optical center and being adapted to operate on light when diverging from the said point source to produce at least one real image, the said optical image forming device and point source of light defining an optical axis in terms of a line through the said optical center and point source of light, an axis control member to control the positions of the said optical center and point source of light and thereby that of the optical axis, the axis control member being freely suspended from a rotatably mounted relatively fixed member to pivot about a pivotal point whereby rotation of the relatively fixed member produces a corresponding rotation of the axis control member about a vertical axis, the said corresponding rotation producing motion of the optical axis to sweep out a conical surface characterised by a semi-angle, and means for adjusting the relative positions of the optical image forming device and the point source of light to reduce the said semi-angle to zero.

2. Axis definition apparatus according to claim 1 in which the optical image forming device is a coarse grating.

3. Axis definition apparatus according to claim 1 in which the means for adjusting the relative positions of the optical image-forming device and the point source of light is adapted to adjust the optical axis to pass through the pivotal point when the axis control member is suspended freely and is in equilibrium.

4. Axis definition apparatus according to claim 3 in which the relatively fixed member is adapted to be rotatable about an approximately vertical axis through the pivotal point, whereby critical adjustment of the optical axis to the vertical is facilitated.

5. Axis definition apparatus according to claim 1 including light beam deflection means to deflect a vertical light beam through a given angle in order to generate an axis at the said given angle to the vertical.

6. Axis definition apparatus according to claim 5 including means to rotate the light beam deflection means about an axis coincident with the said vertical light beam.

7. Axis definition apparatus according to claim 1 wherein the point source of light is adjustable in position relative to the axis control member.

8. Axis definition apparatus according to claim 7 wherein the optical image forming device is adjustable in position relative to the axis control member.

9. Axis definition apparatus according to claim 1 wherein the axis control member is generally tubular, the point source of light and the optical image forming device being located near a respective end of the said axis control member.

10. Axis definition apparatus according to claim 1 wherein the optical image forming device is a converging lens.

11. Axis definition apparatus according to claim 1 wherein the optical image forming device is a concave mirror.

12. Axis definition apparatus according to claim 1 wherein the optical image forming device is a Fresnel zone plate.

13. Axis definition apparatus according to claim 1 wherein the optical image forming device is a reflecting Fresnel zone plate.

14. Axis definition apparatus according to claim 1 wherein the optical image forming device is a lens in combination with a coarse grating.

15. Axis definition apparatus according to claim 1 wherein the optical image forming device is a lens in combination with a Fresnel zone plate.

16. Axis definition apparatus according to claim 1 including a universal joint having relatively fixed and relatively movable arms, the said relatively fixed member being an extension of the relatively fixed arm and the axis control member being an extension of the relatively movable arm.

* * * * *